Sept. 1, 1959

G. G. BROWN

SOLDERING IRON 2,902,577

Filed Jan. 14, 1955

INVENTOR.
GILBERT G. BROWN
BY Geo. G. Hyde
ATTORNEY

Sept. 1, 1959 G. G. BROWN 2,902,577

SOLDERING IRON

Filed Jan. 14, 1955 2 Sheets-Sheet 2

INVENTOR.
GILBERT G. BROWN
BY Geo. G. Hyde
ATTORNEY

United States Patent Office 2,902,577

Patented Sept. 1, 1959

2,902,577

SOLDERING IRON

Gilbert G. Brown, Davenport, Iowa, assignor to Bendix Aviation Corporation, Teterboro, N.J., a corporation of Delaware Application January 14, 1955, Serial No. 481,934

9 Claims. (Cl. 219—26)

This invention relates to soldering irons, and particularly to irons in which the tip is vibrated by ultrasonic waves from a magnetostrictive transducer. Irons of this type have outstanding advantages in tinning metals, such as aluminum and its alloys, as well as magnesium, metals which are very difficult or impossible to tin by using standard irons. However, the heat required at the tip presents a problem, since the metal of the transducer stack loses magnetostrictive properties when heated above its Curie point, which for nickel, the commonest magnetostrictive metal is well below the temperature required for most soldering, but must be connected with the tip through metal that will transmit the ultrasonic waves. Merely lengthening the wave path will reduce heat transmission, but will also increase the power required to produce effective wave action with arrangements heretofore known; whereas shortening the path will increase the heating of the transducer stack, with the danger of reducing or eliminating its energy output.

An object of the invention is to provide a soldering iron of the indicated type with an improved arrangement of heating element, transducer and wave transmission that will reduce the heat transfer from said element to the transducer while maintaining adequate wave energy at the tip. Another object is to lengthen the heat transfer path between the heating element and the stack while maintaining such energy.

A further object is to provide substantially improved, more efficient transmission of ultrasonic waves from the transducer to the tip, and specifically to provide an improved coupling bar construction. A related object is to reduce materially the power required to produce adequate ultrasonic wave energy in the soldering tip.

Another object is to minimize the transmission of waves to the handle, thereby increasing ultrasonic energy efficiency and avoiding discomfort in use.

Other objects are to produce an ultrasonic soldering iron that is relatively low in cost, practical in size and weight, attractive in appearance, suited for continuous use under shop conditions, construced to standard materials, and arranged for replacement of the tip and heating unit.

The foregoing and other objects and advantages of the invention will appear more fully hereinafter from a consideration of the detailed description which follows, in conjunction with the accompanying drawings wherein two embodiments of the invention are illustrated. It is to be expressly understood, however, that the drawings are for the purposes of illustration and description and are not be construed as defining the limits of the invention.

Figure 2:
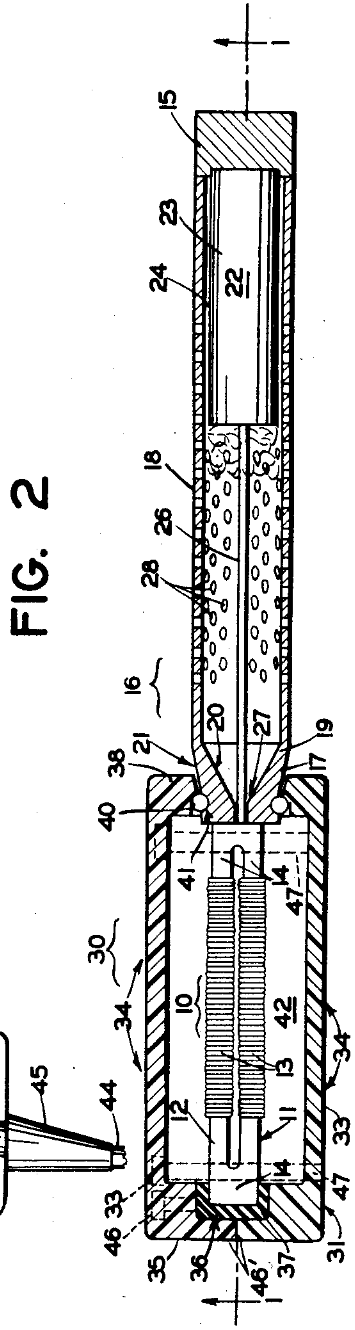
Fig. 2 is a section on line 2—2 of Fig. 1.

The magnetostrictive transducer 10 comprises a laminated stack 11 made up of laminations 12 (Fig. 2), with the windings 13 on the stack legs 14. The stack 11 is connected to the soldering tip 15 through coupling unit 16, comprising a coupling bar 17 and a coupling cylinder 18. Coupling bar 17 is brazed at its base to an end of stack 11 and at its opposite end to an end of coupling cylinder 18. Bar 17 is advantageously formed with a tapering flange 19, the outer end of which registers accurately with the end of cylinder 18 to which it is brazed. The inner face 20 of the flange may be generally conical and axially symmetrical, while the outer face 21 may likewise slope outwardly. With this construction of the coupling bar 17, the gradually reduced cross-section of flange 19 will increase the wave energy per unit cross-section area, and transmit the increased energy to coupling cylinder 18, the indicated contour avoiding the presence of surfaces that might produce objectionable wave deviations or reflection. Coupling cylinder 18 is brazed at its outer end to soldering tip 15, which advantageously has the same outer contour as said cylinder at this point. The heating capsule 22 is of standard type, with the heating element incased in a cylindrical metal shell 23 having its outer heat-transmitting end brazed to, and advantageously set into, the tip 15. The shell 23 is spaced from the inner face of coupling cylinder 18 to prevent direct transmission of heat to the cylinder, the intervening space being either an air space or filled with suitable insulating material, such as the mineral fiber insulation 24, such as "Fiberfrax," a trademark of The Carborundum Company of Niagara Falls, New York. The lead wires 26 extending centrally from the other end of the heating capsule 22 pass through a central opening 27 in coupling bar 17 and a corresponding passage through the end of stack 11 into the space between the stack legs, from which the wires are led to suitable connections.

The arrangement so far described provides an integral operating unit through which both ultrasonic waves and the necessary heat are supplied to the soldering tip 15. The coupling cylinder 18 is advantageously made of a metal that is efficient in conducting the ultrasonic waves but which has a low coefficient of thermal conductivity, stainless steel, Monel metal and Invar having been found effective for this purpose. The coupling bar 17 should be made of the same metal or at least a metal having an acoustic impedance as close as possible to that of the cylinder 18 to reduce to a minimum wave reflections at the junction between bar 17 and cylinder 18. Said cylinder has sufficient length so that during continuous use its temperature at the junction with bar 17 is well below the Curie point of the metal forming stack 11; but it has been found that when the cylinder is made of metal such as those indicated, its length may be sufficiently short to conform to the requirements of practical use without introducing excessive heat at said junction. If desired, top and bottom ventilating holes 28 may be provided in the upper and lower portions of cylinder 18 to carry off heat from the capsule 22.

The construction is planned for ready assembly. It is designed so that the capsule 22 may be initially brazed to tip 15 and then slid into the cylinder 18, the tip being brazed to the outer end of the cylinder. Tips can be changed by heating the brazed connection, removing the tip and its capsule and replacing it with another tip and capsule.

Figure 1:
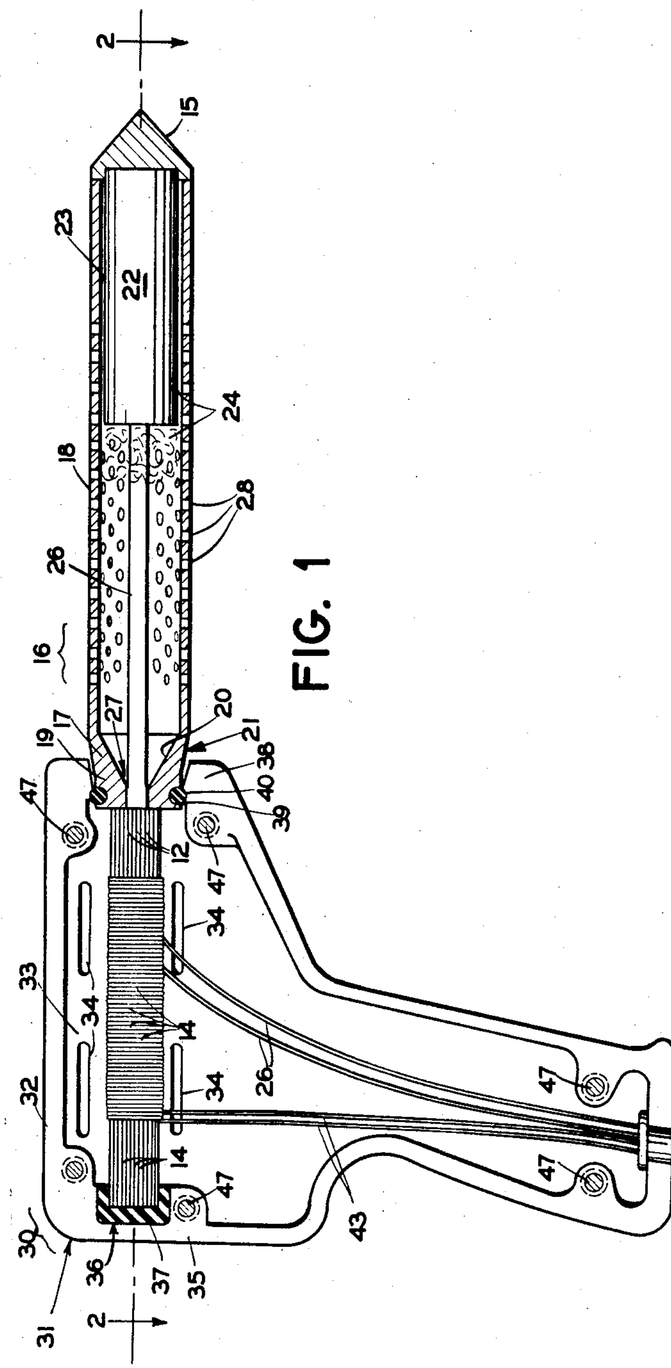
Fig. 1 is a longitudinal central section through an embodiment of the invention, with the stack and heating element shown in elevation.

The described assembly is mounted in a suitable handle, arranged so that mounting connections will not appreciably damp the ultrasonic waves or transmit them to the handle structure. In the form illustrated, the handle is of the pistol grid type, advantageously molded from a suitable synthetic resin. In the embodiment shown in Figs. 1 and 2 the handle 30 is formed with a body portion 31 having a top wall 32 spaced above the transducer 10, with side walls 33 similarly spaced and optionally provided with ventilating openings 34 at opposite sides in alignment with the transducer 10. The rear end wall 35 of body 31 is provided with a socket 36 into which is fitted a cup-shaped end support 37 which fits around the rear end of transducer 10. Support 37 is advantageously made with silicone rubber or similar material. Moreover, the acoustic impedance of the stack 11 and the material of support 37 differ to such an extent that the support serves to reflect back into the transducer 10 waves generated at the junction between the transducer and said support, thereby avoiding material loss of energy at this point and preventing the transmission of significant vibration to the handle 30.

The front end of the transducer 10 is supported from the front end wall 38 of body portion 31, which is provided with a recess 39 engaging an O-ring 40 of suitable elastic material, such as silicone rubber, fitted into an annular groove 41 in the outer face of the base portion of coupling bar 17 adjacent to its junction with stack 11, wall 38 being spaced from coupling bar 17 to minimize transmission of vibration to handle 30. The base of coupling bar 17 is advantageously circular in cross-section for efficiency in mounting O-ring 40, this construction having been found to transmit the waves from stack 11 without material loss; but this showing is not intended to be restrictive.

The handle body portion 31 is integral with a pistol grip portion 42; and the lead wires 26 from heating capsule 22, as well as the lead wires 43 from the stack windings 13, are carried down through the hollow interior of the handle to a cable 44 extending through strain relief 45 set into the bottom of the pistol grip body portion 42. Handle 30 is advantageously constructed in two mating lateral sections 46 and is readily assembled around transducer 10, being held in place by suitable screws 47.

Figure 4:
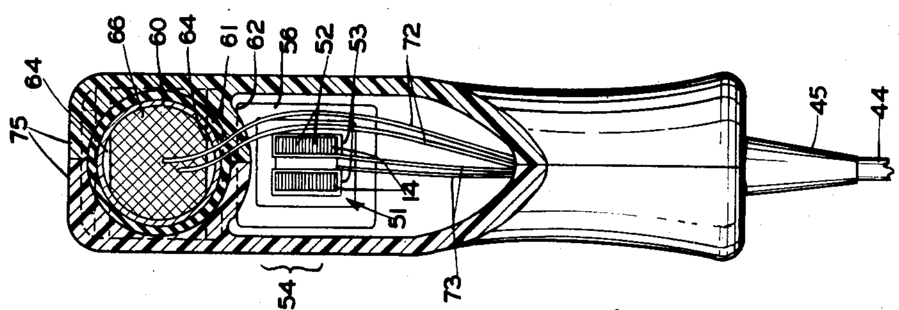
Fig. 4 is a section on line 4—4 of Fig. 3.
Figure 3:
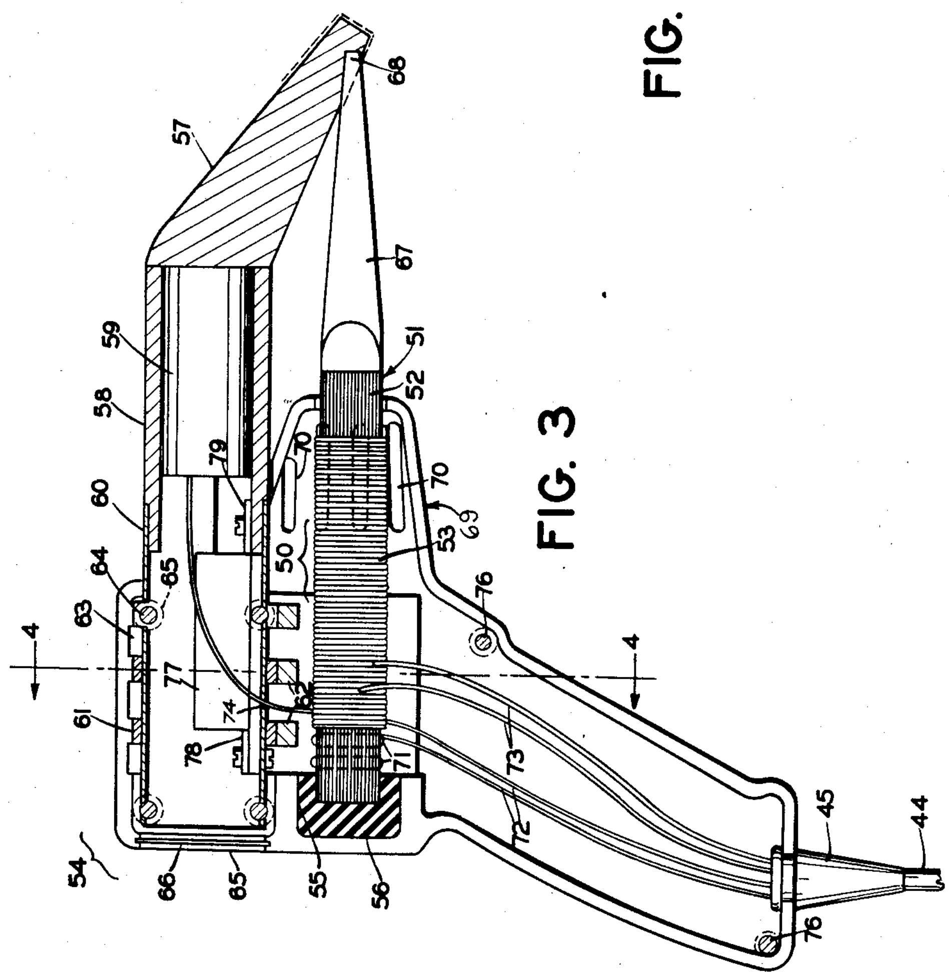
Fig. 3 is a longitudinal central section through another embodiment, with the stack, heating element and coupling bar shown in elevation.

In the modification illustrated in Figs. 3 and 4 the magnetostrictive transducer 50 has a stack 51 and windings 53 similar in construction to stack 11 and windings 13. With this arrangement the handle 54 is in general similar to that of handle 30 and is provided similarly with a socket 55 for the yieldable cup-shaped transducer support 56.

The elongated tapered soldering tip 57 is brazed at its base to cylindrical sleeve 58 which fits heating capsule 59 and holds its end against tip 57. Sleeve 58 is brazed to a much thinner metal supporting cylinder 60, advantageously formed of metal having very low thermal conductivity, suitably mounted in handle 54. In the form illustrated cylinder 60 carries insulating ring 61 held by supporting elements on the handle 54, such as the arcuate supporting bars 62, arranged with openings 63 between them for cooling purposes.

A device for regulating the heating of the iron may conveniently be mounted within cylinder 60. In the form illustrated, a thermostat 77 of standard type is indicated, provided with a mounting lug 78 fixed to the cylinder 60 and a heat transfer lug 79 fixed to the thick sleeve 58.

The cylinder 60 and attached elements are held in place and prevented from turning by screws 64 fitting into recesses 65 in said cylinder and engaging the handle 54. The handle may be provided with an opening 65 for ventilation in register with the end of cylinder 60 and advantageously covered by screen 66. The forward end of transducer stack 52 is brazed to coupling bar 67, whose base fits the end of this stack, and is tapered in frusto-conical form to an end 68 rigidly connected to tip 57. In the arrangement shown coupling bar end 68 is set into and brazed to the operating end portion of said tip 57, bar 67 and tip 57 converging for this purpose. In the form illustrated this is accomplished by mounting tip 57 at an angle on sleeve 58, which is parallel to stack 52. This arrangement permits the use of a bar 67 axially aligned with stack 52 for efficient transmission of ultrasonic waves, and a tip 57 shaped and proportioned for convenience and efficiency in use.

Handle 54 is shaped to surround transducer 50, having a forwardly extending portion 69 extending around but slightly spaced from the forward end of stack 51, and being advantageously provided with a plurality of ventilating openings 70. Other ventilating openings 71 may be likewise provided in the handle 54, preferably at the sides of the stack 51.

The heating capsule leads 72 and the leads 73 from windings 53 pass downwardly through the body and out of the bottom thereof in the manner already described, leads 72 passing through an opening 74 in the cylinder 60 and through the center of stack 51, one of the leads 72 being connected through thermostat 77. Body 54 may likewise be made in two sections 75 held together by screws 64 and 76.

With this arrangement the handle, transducer and tip unit can be readily constructed, connected and mounted in the handle, and different tips may be connected to the same transducer by melting the brazing of bar end 68 and rebrazing it to another tip unit.

In this embodiment the heated portions are substantially spaced from the transducer, with ventilating spaces between except at the very limited area where coupling bar end 68 is in contact with the soldering tip 57; and the length of coupling bar 67, together with the air space around it, provides a minimum of heat transfer and adequate radiation of the heat, so that the temperature at the connection between said bar and the stack 51 will be maintained at a temperature well below the Curie point. Moreover, the transducer arrangement is especially efficient, the ultrasonic waves being concentrated in the reduced end of coupling bar 67, and being applied directly to tip 57 closely adjacent to its operating point. The arrangement also facilitates the construction of a substantially shorter and more compact soldering iron.

For convenience the term "ultrasonic" has been used herein to designate the sound waves that are operative in this invention; and while waves in this range are especially advantageous, ranging from 15 kc. to 60 kc. with best results between 18 kc. and 25 kc., waves outside of these frequencies may be used.

Although only two embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art. For instance, while a brazed connection between the coupling bar and the soldering tip has been disclosed, and is unexpectedly advantageous because of the efficiency with which ultrasonic waves have been found to travel through a joint of this type, other arrangements for providing the necessary engagement between bar and tip may be provided.

I claim:

1. An ultrasonic soldering iron, comprising a soldering tip, a source of ultrasonic waves including a cylindrical member having an end in wave-transmitting engagement with an area of an end of the tip, and a source of soldering heat located within the cylindrical member in heat-transmitting engagement with an area of the same end of the tip.

2. An ultrasonic soldering iron, comprising a soldering tip, a source of ultrasonic waves including a cylindrical member having an end in wave-transmitting engagement with an area of an end of the tip, a source of soldering heat located within the cylindrical member in heat-transmitting engagement with an area of the same end of the tip and spaced from said cylindrical member, and an insulating medium located between the cylindrical member and said source.

3. An ultrasonic soldering iron, comprising a metal soldering tip, a metal magnetostrictive transducer, a wave-transmitting coupling unit connecting the transducer and the tip, and tip heating means, the coupling unit being of metal different from the tip and transducer metals, having a coefficient of thermal conductivity at which its temperature at the transducer is below the Curie point of the transducer.

4. An ultrasonic soldering iron, comprising a soldering tip, means for heating the tip, and means for transmitting ultrasonic waves to the tip comprising a magnetostrictive transducer, a hollow coupling cylinder having an end engaging the tip, and a coupling bar including a base engaging an end of the transducer and an annular flange engaging the other end of the cylinder.

5. An ultrasonic soldering iron, comprising a soldering tip and means for transmitting ultrasonic waves to the tip, comprising a magnetostrictive transducer, a coupling cylinder having an end engaging the tip and a coupling bar including a base engaging an end of the transducer and an annular tapered flange having a generally conical inner face and an end registering with and engaging the other end of the cylinder.

6. An ultrasonic soldering iron, comprising a magnetostrictive transducer, a wave-transmitting coupling element fixed to an end of the transducer and including a hollow cylinder, a soldering tip fixed to an end of the cylinder, and a heating element in the cylinder fixed to the tip.

7. An ultrasonic soldering iron, comprising a soldering tip, a heating element, a magnetostrictive transducer and a wave transmitting coupling element connecting the transducer and the tip formed of a metal having a substantially lower coefficient of thermal conductivity than the tip, said elements, transducer and tip being interconnected to form an integral operating unit; and a handle for said unit extending around the transducer and in supporting engagement therewith adjacent to at least one node, including a resilient supporting member engaging the handle and an end of the transducer.

8. An ultrasonic soldering iron, comprising a soldering tip, a heating element, a magnetostrictive transducer and a wave-transmitting coupling element connecting the transducer and tip formed of a metal having a substantially lower coefficient of thermal conductivity than the tip, said elements, transducer and tip being interconnected to form an integral operating unit; and a support for said unit, including a resilient supporting member engaging the handle and an end of the transducer and a second resilient supporting member engaging the handle and said unit adjacent to the other end of the transducer.

9. An ultrasonic soldering iron, comprising a soldering tip, a heating element, a magnetostrictive transducer, a wave-transmitting member connecting the transducer to the tip, said member including a coupling bar engaging the transducer and formed of a metal having a substantially lower coefficient of thermal conductivity than the tip, said elements, transducer member and tip being interconnected to form an integral operating unit; and a handle for said unit extending around the transducer and in supporting engagement with the unit, including a resilient support engaging the handle and an end of the transducer, and a second resilient support engaging the handle and the coupling bar adjacent to the transducer.

References Cited in the file of this patent

UNITED STATES PATENTS

| | | |
|---|---|---|
| 2,397,400 | Barwick | Mar. 26, 1946 |
| 2,636,998 | Davis et al. | Apr. 28, 1953 |
| 2,651,148 | Carwile | Sept. 8, 1953 |
| 2,676,236 | Birkbeck et al. | Apr. 20, 1954 |

FOREIGN PATENTS

| | | |
|---|---|---|
| 658,922 | Great Britain | Oct. 17, 1951 |
| 713,566 | Great Britain | Aug. 11, 1954 |
| 719,386 | Great Britain | Dec. 1, 1954 |
| 814,765 | Germany | Sept. 24, 1951 |

OTHER REFERENCES

Thomas et al.: "Soldering Aluminum Alloys," Electronics June 1948, pages 90–92, pages 90–92 relied upon.

Crawford: "Ultrasonic Tinning Techniques for Aluminum," Electronics, December 1952, pages 103–105; page 103 relied upon.